United States Patent
Shuster et al.

(10) Patent No.: US 10,198,154 B2
(45) Date of Patent: *Feb. 5, 2019

(54) TRANSLATING USER INTERFACES OF APPLICATIONS

(71) Applicants: Gary Stephen Shuster, Fresno, CA (US); Brian Mark Shuster, Vancouver (CA)

(72) Inventors: Gary Stephen Shuster, Fresno, CA (US); Brian Mark Shuster, Vancouver (CA)

(*) Notice: Subject to any disclaimer, the term of this patent is extended or adjusted under 35 U.S.C. 154(b) by 425 days.

This patent is subject to a terminal disclaimer.

(21) Appl. No.: 15/162,515

(22) Filed: May 23, 2016

(65) Prior Publication Data
US 2016/0266754 A1    Sep. 15, 2016

Related U.S. Application Data

(63) Continuation of application No. 13/919,930, filed on Jun. 17, 2013, now Pat. No. 9,348,666.

(60) Provisional application No. 61/661,317, filed on Jun. 18, 2012.

(51) Int. Cl.
| | |
|---|---|
| G06F 3/0484 | (2013.01) |
| G06F 9/54 | (2006.01) |
| G06Q 20/10 | (2012.01) |
| G06Q 30/00 | (2012.01) |
| G06F 3/0481 | (2013.01) |
| G07F 17/32 | (2006.01) |
| G09G 5/377 | (2006.01) |

(52) U.S. Cl.
CPC .......... *G06F 3/0484* (2013.01); *G06F 3/0481* (2013.01); *G06F 9/541* (2013.01); *G06Q 20/102* (2013.01); *G06Q 30/00* (2013.01); *G07F 17/32* (2013.01); *G07F 17/3225* (2013.01); *G07F 17/3281* (2013.01); *G09G 5/377* (2013.01); *G06F 2203/04804* (2013.01)

(58) Field of Classification Search
CPC .................................................. G06F 3/0484
USPC ........................................................ 715/746
See application file for complete search history.

(56) References Cited

U.S. PATENT DOCUMENTS

| | | | |
|---|---|---|---|
| 6,360,363 B1* | 3/2002 | Moser | G06F 8/656 |
| | | | 717/170 |
| 7,047,088 B2* | 5/2006 | Nakamura | G06F 3/1204 |
| | | | 358/1.15 |

(Continued)

*Primary Examiner* — Reza Nabi
(74) *Attorney, Agent, or Firm* — Sherrie Flynn; Coleman & Horowitt, LLP (57) ABSTRACT

A user interface translation system can provide functionality of translating at least a portion of a user interface of a primary application. The user interface translation system may, for instance, add an overlay interface over a portion of the primary application. The primary application can conduct all the processing tasks. The overlay interface can correspond to user interfaces of well-known applications that users may prefer. In certain embodiments, users can select from a list of overlay interfaces. The user interface translation system can receive user control input from the overlay interface and map the received input to a corresponding command for the primary application. The user interface translation system can also train users to adapt to a change in user interface over a period of time or usage.

20 Claims, 10 Drawing Sheets

(56) References Cited

U.S. PATENT DOCUMENTS

| | | | | |
|---|---|---|---|---|
| 7,426,692 B2* | 9/2008 | Novak | ............... | G06T 11/00 |
| | | | | 715/744 |
| 2003/0048286 A1* | 3/2003 | Lal | ............... | G06F 9/452 |
| | | | | 715/700 |
| 2003/0220969 A1* | 11/2003 | Kojima | ............... | G06F 17/3089 |
| | | | | 709/203 |
| 2005/0166199 A1* | 7/2005 | Willis, II | ............... | G06F 8/65 |
| | | | | 717/173 |
| 2006/0215199 A1* | 9/2006 | Morita | ............... | G06F 3/1207 |
| | | | | 358/1.13 |
| 2009/0049389 A1* | 2/2009 | Kuzmanovic | ............... | G06F 9/451 |
| | | | | 715/745 |
| 2009/0253494 A1* | 10/2009 | Fitch | ............... | A63F 13/12 |
| | | | | 463/25 |
| 2009/0265645 A1* | 10/2009 | Park | ............... | G06F 9/4445 |
| | | | | 715/762 |
| 2009/0313544 A1* | 12/2009 | Wood | ............... | G06F 3/048 |
| | | | | 715/716 |
| 2010/0095214 A1* | 4/2010 | Ferlitsch | ............... | G06F 9/451 |
| | | | | 715/733 |
| 2010/0162233 A1* | 6/2010 | Ku | ............... | G06F 8/60 |
| | | | | 717/178 |
| 2011/0166966 A1* | 7/2011 | Gunn | ............... | G06Q 10/087 |
| | | | | 705/28 |
| 2013/0047098 A1* | 2/2013 | Shuster | ............... | G06T 19/20 |
| | | | | 715/757 |

* cited by examiner

TRANSLATING USER INTERFACES OF APPLICATIONS

CROSS-REFERENCE TO RELATED APPLICATIONS

This application a continuation of U.S. application Ser. No. 13/919,930, filed Jun. 17, 2013, now U.S. Pat. No. 9,348,666, which claims priority under 35 U.S.C. § 119(e) to U.S. Provisional Patent Application No. 61/661,317, filed Jun. 18, 2012, and titled "ENHANCED COMPUTERIZED GAMING APPLICATIONS AND NON-GAMING APPLICATIONS," the entirety of which is hereby incorporated by reference and made a part of this specification for all that it discloses. Further, this application incorporates by reference in its entirety U.S. application Ser. No. 13/919,776, filed Jun. 17, 2013 titled "TRANSFER OF VIRTUAL OBJECTS BETWEEN APPLICATIONS."

BACKGROUND

It takes significant investment of time to become proficient with a user interface of a particular application. With increasing numbers of devices and operating systems, users are often forced to learn new user interfaces when moving between systems and applications. For example, a user may be most familiar with a Microsoft Word user interface for a word processing application. But, at work or on their portable device, they might have to use another word processing application, for example, Open Office or Google Docs. Learning the user interface of the second word processing application may waste time and decrease productivity.

SUMMARY

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

In certain embodiments, a system for translating user interfaces can include one or more hardware processors configured to execute a plurality of software modules. The software modules can include at least an overlay interface generator module that can generate an overlay user interface associated with a secondary application. The overlay user interface can be displayed in place of at least a portion of a user interface of a primary application. In some embodiments, the overlay user interface can be display over at least a portion of a user interface of the primary application. The overlay user interface can include plurality of user interface controls. The system can also include a translator module. The translator module can receive a user control input corresponding to a particular user interface control of the plurality of user interface controls. In some embodiments, the translator module can translate the received particular user control input to a corresponding one or more commands associated with the primary application, wherein the corresponding one or more commands are selected such that execution of the one or more commands results in substantially the same output as execution of a command associated with the particular user interface control by the secondary application. The translator module can also initiate execution of the corresponding one or more commands by the primary application. In some embodiments, user control input can be received via an accessibility device. The user control input can also be received by a non-contact input including a hand gesture, eye movement, body movement, feet movement, or audio.

Additionally, in certain embodiments, a method of translating user interfaces can include generating an overlay user interface associated with a secondary application. The overlay user interface can be displayed in place of at least a portion of a user interface of a primary application. The overlay user interface can include a plurality of user interface controls. The method can further include receiving a user control input corresponding to a particular user interface control of the plurality of user interface controls. Furthermore, the method can include translating, by a computing system having one or more computer processors, the particular user interface control to a corresponding one or more commands associated with the primary application. The corresponding one or more commands can be selected such that execution of the one or more commands results in substantially the same output as execution of a command associated with the particular user interface control by the secondary application. The method can also include initiating execution of the corresponding one or more commands by the primary application.

BRIEF DESCRIPTION OF THE DRAWINGS

Embodiments disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIG. 1A illustrates an embodiment of a user interface of a primary application and an embodiment of an overlay interface.

FIG. 1B illustrates an embodiment of the overlay interface translated on to a portion of the user interface of the primary application.

FIG. 2 illustrates an embodiment of a computing environment including a U/1 translator system that can enable translation of at least a portion of the primary application's user interface.

FIG. 3 illustrates an embodiment of a user interface translation process.

FIG. 4 illustrates an embodiment of a training process by gradually changing the user interface controls.

FIG. 5A illustrates an embodiment of an Open Office user interface.

FIG. 5B illustrates an embodiment of a Microsoft Word user interface.

FIG. 5C illustrates an embodiment of a portion of the Open Office user interface translated to an overlay corresponding to the Microsoft Word user interface.

FIG. 5D illustrates an embodiment where an entire Open Office user interface is translated to an overlay corresponding to the Microsoft Word user interface.

DETAILED DESCRIPTION OF SPECIFIC EMBODIMENTS

I. Introduction

It takes significant investment of time to become proficient with a user interface of a particular application. With increasing numbers of devices and operating systems, users are often forced to learn new user interfaces when moving between systems and applications. For example, a user may prefer Microsoft Word user interface for a word processing application. But, at work or on their portable device, they might have to use another word processing application, for example, Open Office or Google Docs. Learning the user interface of the second word processing application may waste time and decrease productivity. It may not matter to the users whether the underlying application is Microsoft Office, Open Office, or Google Docs as long as they are able to carry on their word processing tasks. Thus, it may be beneficial to provide users with the ability to exchange the user interface of the underlying application with a user interface that increases their productivity.

This disclosure describes embodiments of a user interface translation system that can translate some or all of the user interface or front end elements of other systems, applications or games, including ones with which the user is more familiar. The user interface translation system can import, overlay, or otherwise make functional an interface corresponding to a second application with a primary application. For example, the user interface translation system can integrate an overlay corresponding to Microsoft Word 2007 with an Open Office Writer (primary application) from Apache Open Office 3.0. The tabbed menu system of Microsoft Word is significantly different than the pull-down menu system of Open Office. A user wishing to transition her skills from Microsoft Word to the Open Office may utilize the user interface translation system to map features and/or functions of Microsoft Word to similar or identical features and/or functions of Open Office.

The user interface translation system can also assist administrators in training users to shift from one user interface to another. In some embodiments, the user interface translation system can automatically change the overlay user interface based on usage patterns.

II. Example User Interface Translation

Figure 1A:
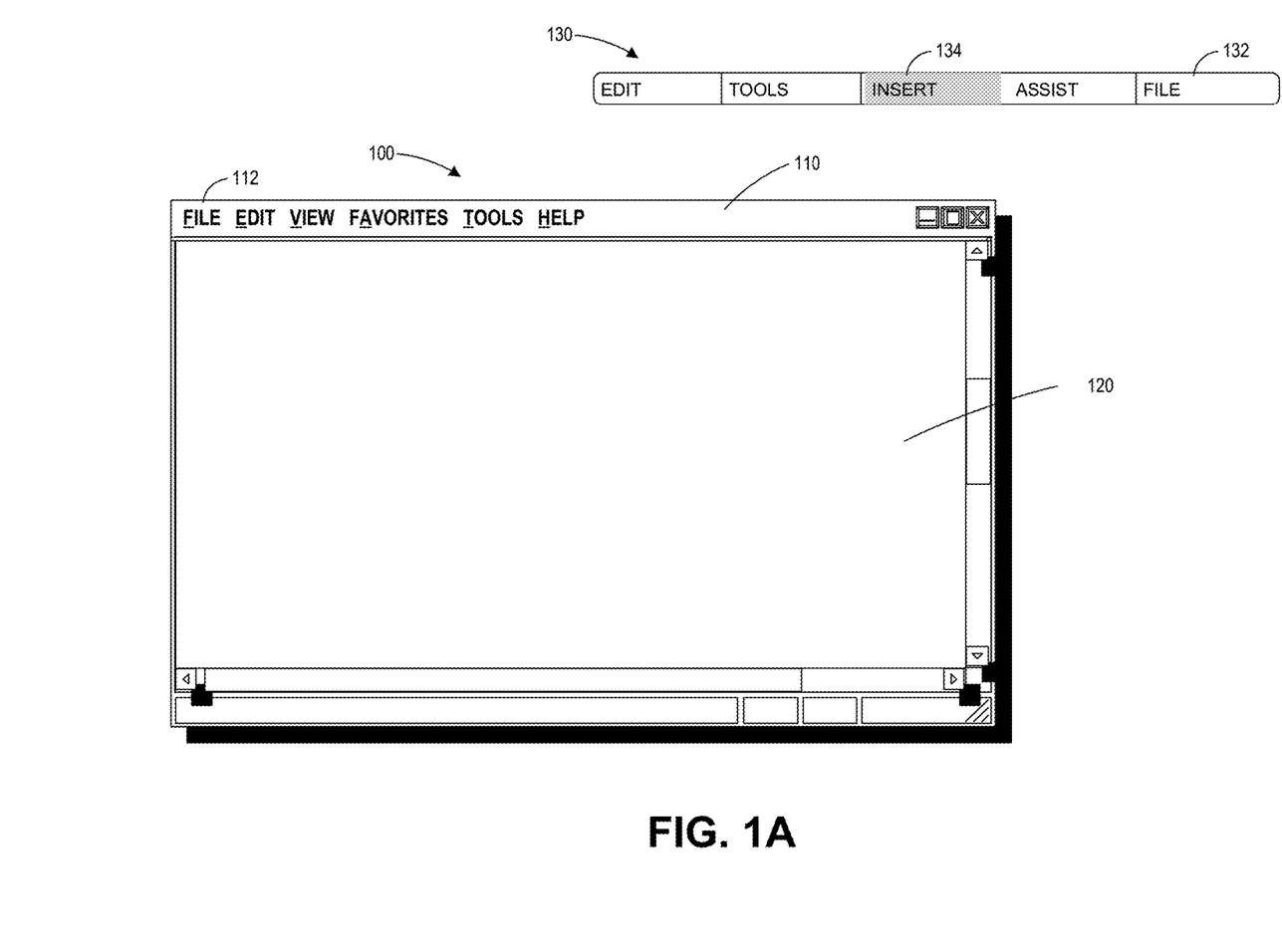

FIG. 1A illustrates an embodiment of a user interface 100 of a primary application and an overlay interface 130. The primary application can include one or more processing modules for performing a variety of tasks. In certain embodiments, the primary application can provide users with word processing capability. The primary application can be a Microsoft Word application, an Open Office application, a Google Doc application, an Evernote application, or any other word processing application. In some embodiments, the applications may involve spreadsheets, calculations, programming, gaming, educational software, or other applications capable of utilizing a user interface. In one embodiment, the primary application may be partially or entirely stored in a server. While much of the discussion herein is with reference to word processors, the systems and methods for overlaying interfaces applies to any other type of application or software system.

The user interface 100 of the primary application can include a first portion 110 and second portion 120. In some embodiments, the first portion 110 can include a menu portion of the primary application. The menu portion may include one or more user controls 112. Example user interface controls 112 are shown, including buttons, drop down menu, and the like. Any of the user interface controls shown can be replaced with other user interface controls, including but not limited to status bars, hyperlinks, links, radio buttons, check boxes, text boxes, select boxes or drop-down boxes, combinations of the same, and the like. The second portion 120 of the user interface 100 of the primary application can include an input/output portion of the primary application 100. For example, the second portion 120 can include an area where users can type words, insert pictures, draw tables and perform other word processing functionalities.

Figure 1B:
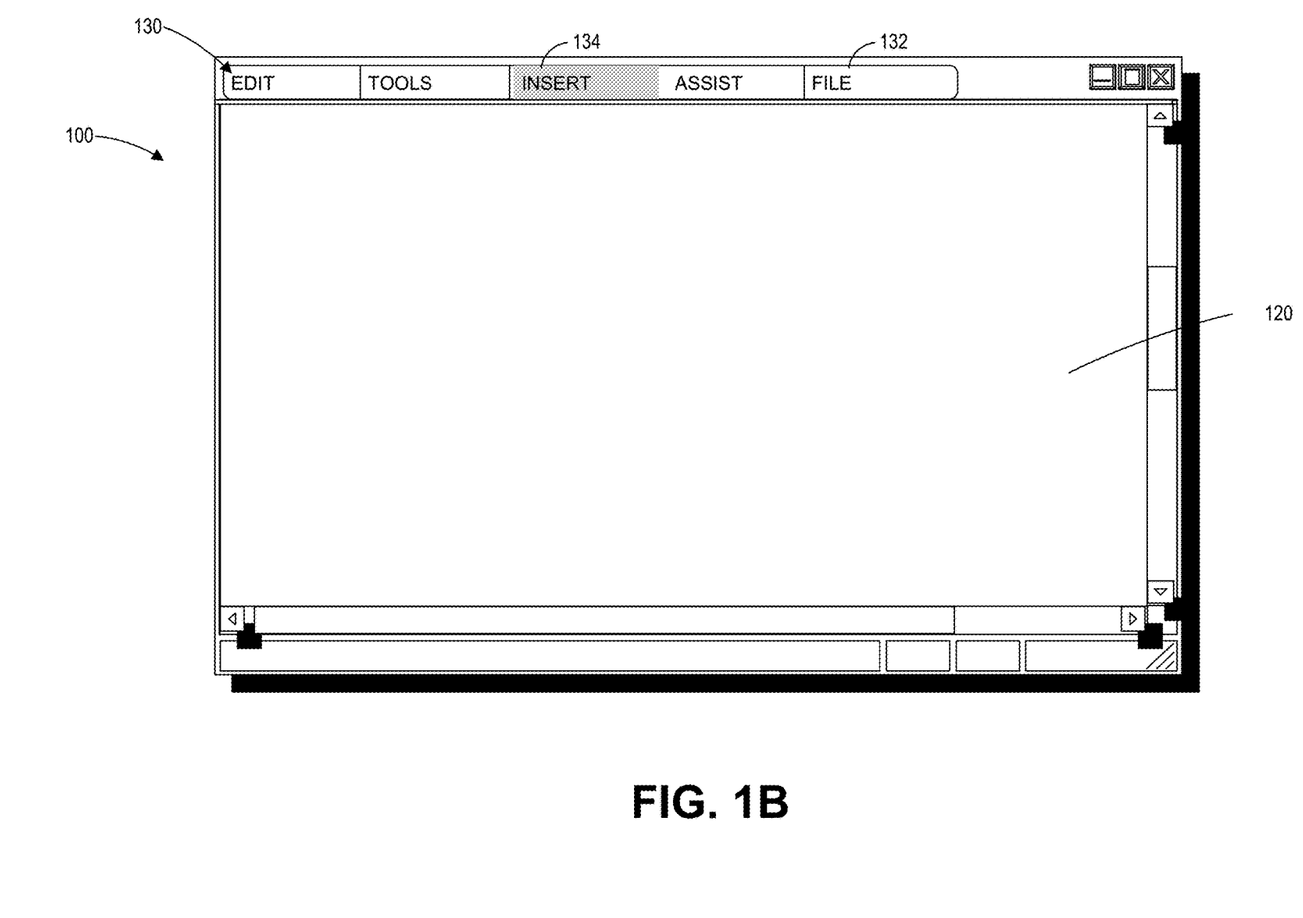

In some embodiments, the first portion 110 of the primary user interface 100 can be exchanged with the overlay interface 130 as shown in FIG. 1B. The overlay interface 130 can include one or more user controls 132. Example user interface controls 132 are shown, including buttons, drop down menu, and the like. Any of the user interface controls shown can be replaced with other user interface controls, including but not limited to status bars, hyperlinks, links, radio buttons, check boxes, text boxes, select boxes or drop-down boxes, combinations of the same, and the like.

The overlay interface 130 can be more preferable to a user than the native first portion 110 of the user interface 100 of the primary application. For example, a user may be more familiar with the arrangement of user controls in the overlay interface 130. As shown in FIGS. 1A and 1B, the overlay interface 130 can include some user controls that are identical (or substantially the same) to the user controls of the primary application 100. As shown, the user control 132 of the overlay interface 130 and the user control 112 of the primary application may provide substantial functionality but can be in a different location relative to each other. For example, the "File" user control 112 may be in the left most position in the primary application. However, in the overlay user interface 130, the "File" user control 132 can be arranged in the far right position. The change in position may reflect user preferences. The change in position may also reflect where that user interface control is typically found in a secondary application. The secondary application may be an application that is more familiar to the user. As an example, a user may be more proficient with Microsoft Word and used to having the "File" user control on far right. But, in the primary application, the "File" user control might be on the far left. Translating the first portion 110 of the primary application to overlay interface 130 as shown in FIG. 1B can enable users to maintain their proficiency. The translation functionality is described more in detail with respect to FIG. 2.

The overlay interface 130 can also include user controls that are not provided or that do not identically match the functionality of user controls in the primary application. As shown, the user interface control 134 is not provided in the primary application. Also, the functionality of the user control 134 may not be substantially identical to any of the user controls provided in the primary application. Accordingly, the user control 134 may include a feature to make aware of the difference. The feature may include highlighting, different coloring, or shading as shown. The differences may also be made available to the user using another overlay, for example, a balloon, and/or different display of the feature actuation target. In some embodiments, the difference might be in the underlying functionality. For example, the word counting algorithm of the primary application may vary from the algorithm that the user associates with a secondary application corresponding to the overlay interface. Thus, a user can be notified of the differences through highlighting or information overlay or like.

Further, the overlay interface 130 can also omit some of the user interface controls found in the primary application 100. In some embodiments, users may customize overlay interface 130. The overlay interface 130 may also automatically change over time as described more in detail below. For example, the arrangement of user controls 132 can change over time based on usage pattern of those user controls. In an aspect, an agent may intercept some or all user input and pass such input on to an application. The agent may then intercept some or all data or output intended for display or other presentation to a user and pass such output on to the user. In passing such input to an application, the agent may emulate a human user, such as by emulating a mouse click event or a keypress. In passing such output to the user, the output may be altered, in some cases to appear more consonant with the apparent user interface presented to the user. In some cases, the input and/or output may be altered to increase accessibility for those with different abilities, such as by increasing the size of the output for the visually impaired or by decreasing the amount of accuracy required in clicking a mouse for those who have small motor control impairments. In other cases, the input and/or output may be placed through a machine or other translation mechanism.

III. User Interface Translation System

Figure 2:
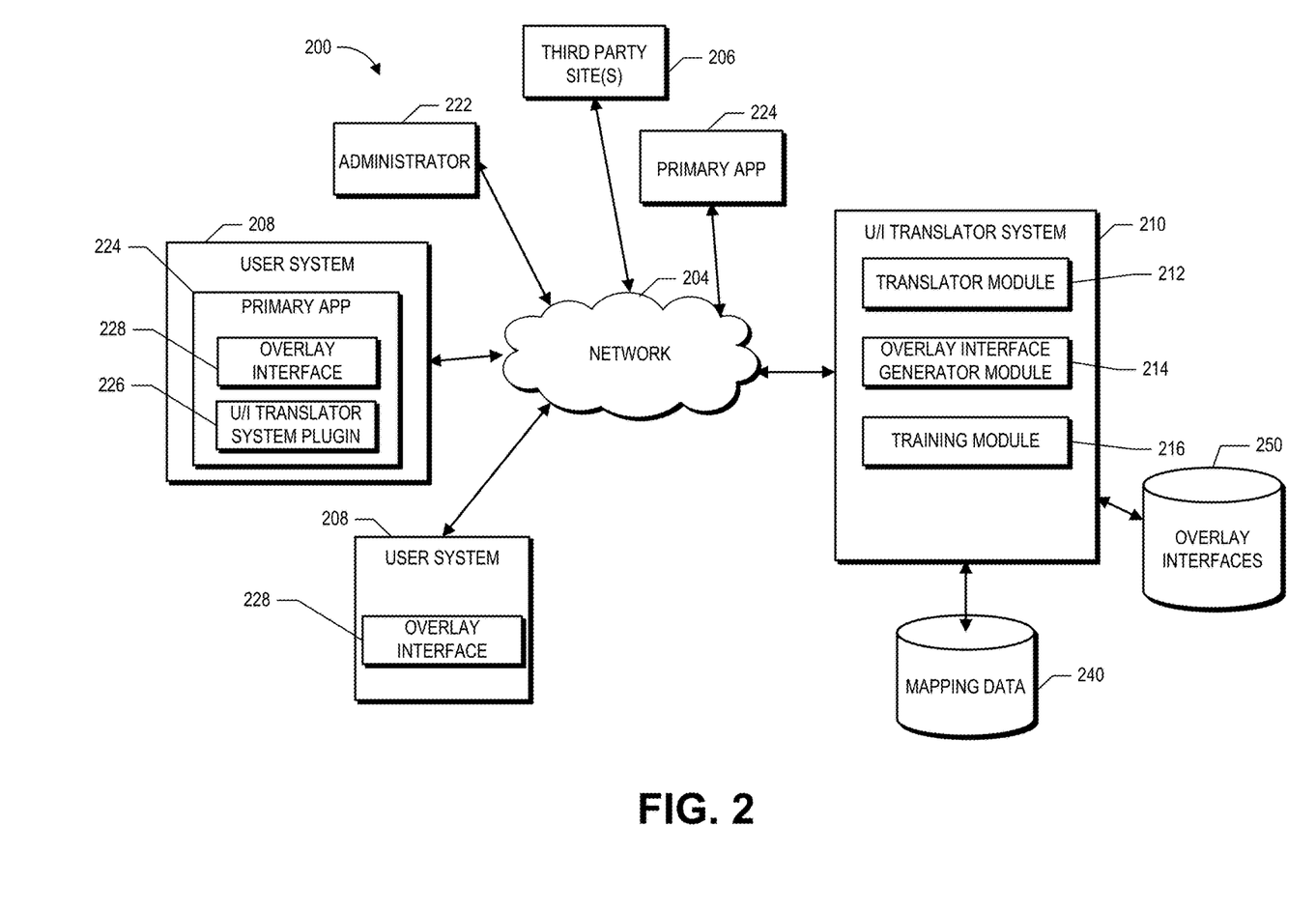

FIG. 2 illustrates an embodiment of a user interface (U/1) translation system 200 for providing users with a translated user interface for an underlying primary application 220. In one embodiment, the system 200 can translate a portion of the user interface of the primary application as described with respect to FIG. 1. In another embodiment, the system 200 can translate the entire user interface of the primary application as described more in detail below.

Overlay Interface Generator Module

The system 210 can include an overlay interface generator module 214 that can generate a variety of overlay interfaces 228. In some embodiment, users can select a preferred overlay interface from a list of overlay user interfaces. The overlay user interface data can be stored in overlay interface repository 250. For example, if the primary application is OpenOffice, users can select an overlay interface corresponding to one of Microsoft Word, Google Docs, or any other custom overlay interface. The U/1 translator system may also be able to import overlay user interfaces from third party sites 206. In one embodiment, the overlay interface generator module 214 can exchange a portion of the user interface of the primary application with an overlay interface as described with respect to FIG. 1.

The overlay interface generator module 214 can also generate an entire overlay user interface 228 for user systems 208. In this instance, the generated overlay interface 228 can function as the main user interface for the primary application 224. The primary application 224 can be implemented on one or more servers. Users can interact with the overlay interface 228 without worrying about which underlying primary application might be performing the processing. For example, the system 210 may generate a Microsoft Word user interface at the user system 208, but the underlying processing may be done by another primary application, such as Google Drive or Open Office. In some embodiments, the primary application 224 may be running on one or more servers. While in other embodiments, the primary application 224 may be running in background on the user systems 208. Accordingly, the primary applications 224 may be replaced or modified without significantly affecting the users. The users can continue working with the overlay interface that they are proficient in while the primary application is replaced.

The overlay interfaces can be generated by the U/1 translator system 210, the U/1 translator system plugin 226, or a combination of both. The system 210 can generate overlay interfaces for web browsers, stand-alone client applications, or mobile applications. The system 210 can also generate overlay interfaces that can use capabilities of that particular device. For example, the system 210 can generate overlay interfaces for a wide range of user systems 208, such as motor vehicles, google glass, a digital video recorder (DVR), game consoles, entertainment systems, etc. In one embodiment, the overlay interface can integrate touch functionality of the user system 208. Devices such as google glass, a vehicle dashboard, or an entertainment system menu may have unique user controls input capabilities. The U/1 translator system 210 can generate overlay interfaces that can take advantage of these unique user control inputs (for example, hand/motion gestures, head movements, eye movements, etc). Accordingly, the U/1 translator system 210 can provide a customized overlay interface 228 that can be integrated with the controls of the user system 208 to access the processing power of a primary application 224 in the background. As described above, the primary application can run on the user system 208 or one or more servers.

In one embodiment, the U/1 translator system 210 is configured to translate an input from a user on a particular device (e.g., Google Glass) to an input on another device (e.g., a desktop PC), possibly in addition to translation of a user control input provided. For example, a certain input on Google Glass, e.g., a quick eye movement to the right, may be translated by the U/1 translator system 210 to a particular input on a desktop PC, e.g., moving a cursor to the far right of a menu, such as based on input command translations indicated in a data structure. Such an input command translation may then be used to select a user control input on an overlay interface of a secondary application, e.g., selection of a menu command that is to be translated to one or more commands in a primary application.

Translator Module

The system 210 can also include a translator module 212 to enable mapping between the overlay user interface 228 and the primary application 224. In one embodiment, the translator module 212 can receive user control input from the overlay interface 228. The translator module 212 can map the received user control input to a corresponding command (or combination of commands) compatible with the primary application. The translator module 212 can then transmit the mapped command to the primary application 224. The mapping data can be stored in a mapping data repository 240, such as in one or more translation data structures (discussed further below with reference to FIG. 3. The translator module can identify the overlay menu and the primary application to perform the mapping. In some instances, an overlay menu ID and a primary application ID inputs are received by the translator module 212 along with the user control input. For example, the translator module 212 can receive a user control input corresponding to a font change (e.g. Bold) from the overlay interface 228. Along with the user control input, the translator module 212 can also receive an overlay ID and a primary app 10. In some instances, the overlay ID and the primary ID can be fixed. As an example, the overlay ID could correspond to Microsoft Word and the primary app ID could correspond to OpenOffice. The translator module 212 can map the user control input (e.g. "Bold") received from the overlay interface to an equivalent command compatible with the primary application 224. Subsequently, the translator module 212 can send the mapped command to the primary application 224. The primary application 224 can subsequently process the received command.

In some instances where the overlay interface 228 functions as the sole user interface for the primary application 224, the translator module can also receive output from the primary application 224. The translator module can send the output from the primary application 224 to the overlay interface 228. The overlay interface generator module 214 may enable the output from the primary application to be displayed in a proper format in the overlay interface 228. Accordingly, users can interact with the overlay interface 228 while the primary application is processing in the background.

Example Implementation

The U/1 translation system 210 can be implemented in computer hardware and/or software. The U/1 translation system 210 can execute on one or more computing devices, such as one or more physical server computers. In implementations where the U/1 translation system 210 is implemented on multiple servers, these servers can be co-located or can be geographically separate (such as in separate data centers). In addition, the U/1 translation system 210 can be implemented in one or more virtual machines that execute on a physical server or group of servers. Further, the U/1 translation system 210 can be hosted in a cloud computing environment, such as in the Amazon Web Services (AWS) Elastic Compute Cloud (EC2) or the Microsoft® Windows® Azure Platform.

The user systems 208 can remotely access the U/1 translation system 110 on these servers through the network 204. The user systems 208 can include thick or thin client software that can access the U/1 translation system 210 on the one or more servers through the network 204. The network may be a local area network (LAN), a wide area network (WAN), such as the Internet, combinations of the same, or the like. For example, the network 204 can include an organization's private intranet, the public Internet, or a combination of the same. In some embodiments, the user software on the user system 208 can be a browser software or other application software. The user system 208 can access the U/1 translation system 210 through the browser software.

In certain embodiments, the U/1 translation system 210's functionality can be implemented on the user systems 108. The U/1 translation system 210 can be integrated with the primary application through a plug-in or an API (application programming interface). In some embodiments, the primary application may come pre-installed with a plug-in to the U/1 translation system 210. In other embodiments, a plugin to the U/1 translation system 210 may be installed on to a primary application. For example, the U/1 translation system plug-in can be installed on an Open Office application.

In general, the user systems 208 can include any type of computing device capable of executing one or more applications and/or accessing network resources. For example, the user systems 208 can be desktops, laptops, netbooks, tablet computers, smartphones, PDAs (personal digital assistants), servers, e-book readers, video game platforms, television set-top boxes (or simply a television with computing capability), a kiosk, combinations of the same, or the like. The user systems 208 include software and/or hardware for accessing the U/1 translation system 210, such as a browser or other client software.

IV. Example User Interface Translation Process

Figure 3:
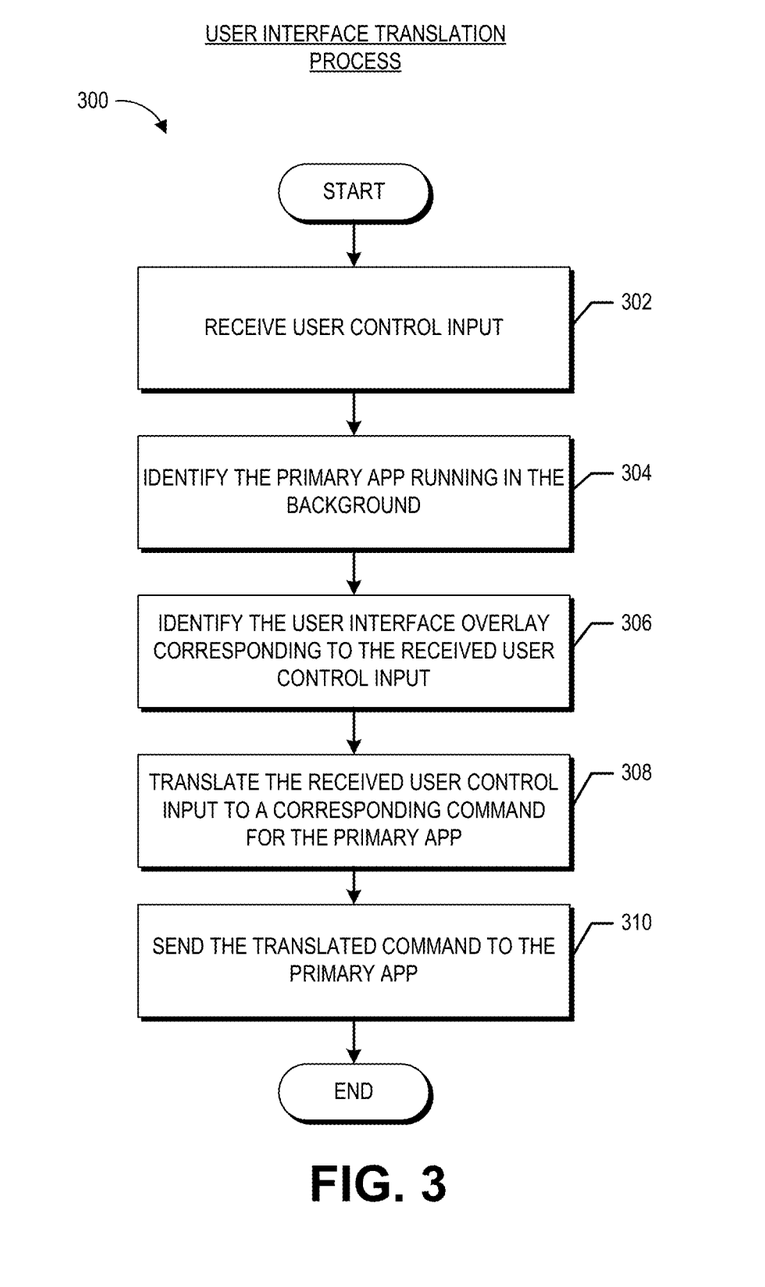

FIG. 3 illustrates an embodiment of a user interface translation process 300 for translating a received user control input from an overlay interface to a corresponding command for the primary application. The user interface translation process can be implemented by any of the systems described above. For illustrative purposes, the process 300 will be described as being implemented by components of the computing environment 200 of FIG. 2. The process 300 depicts an example overview of user interface translation. The process can be performed in response to a user control input from a user, for example, by the user selecting or clicking on one of the user controls 132 of the overlay interface 132 shown in FIG. 1.

The process 300 begins at block 302, where the U/1 translation system receives a user control input. In some embodiments, the user control input can be from selection of a user control by the user. In another embodiment, the user control input can be from a touch sensor or a motion sensor. In a word processing type application, for example, the user may select a user control (e.g. button) to calculate a word count. The translator module 212 can receive the user control input to calculate a word count. In some embodiments, the U/1 translation system receives a primary app ID input to identify the primary application running in the background at block 304. The primary app ID may also be stored or fixed in U/1 translation system. In one embodiment, the translator module 212 can also receive overlay interface ID corresponding to the received user control input at block 306. The overlay interface ID may also be stored or fixed in the U/1 translation system. At block 208, the translator module 212 can then translate the received user control input to a corresponding command for the primary application. The translation may be based on a command lookup in one or more translation data structures (e.g., a translation table or database). For example, the translation data structure may be configured to translate user control inputs of a secondary application (e.g., a click on a particular menu command) to corresponding commands of a primary application (e.g., one or more commands within another application). Depending on the embodiment, the translation data structure may be stored on the U/1 translation system and/or the user system 208. In one embodiment, the translation data structure is stored on the user system 208 (perhaps after having been generated by the U/1 translation system 210 in response to the user providing the desired primary and secondary applications) such that the translation may be performed faster than if the translation data structure is stored only at the U/1 translator system. In such embodiments, the translation may occur without any network communications to the U/1 translator system or even without connection to the Internet.

In another aspect, the translation system and/or database may be modified by the user, an administrator, or another entity. This may be used to create a single, unified interface for a plurality of applications. For example, the user might desire that an interface designed by that user, or an interface familiar to that user such as the Microsoft Word interface, be the basis for the user interface for all applications used by the user. However, certain functions in other applications may not have an analogue in Microsoft Word, just as certain Microsoft Word functions may not have an analogue in other applications. The user may alter the interface to remove certain elements when running an application without functions corresponding to those elements, just as the user may alter the interface to add certain elements when running an application with functions that do not have corresponding control mechanisms in the existing interface. In another aspect, the interface may simply be modified for the convenience of the user.

Continuing with the above example, the translator module 212 can identify the user control input for word count using overlay interface ID and map it to a corresponding command based on the primary app ID. At block 310, the translator module 212 can send the mapped command to the primary application for processing. In one embodiment, the translation and execution of a command (as discussed above) in a primary app may occur in real-time or substantially real-time, such that the translation is quick enough so that the user cannot detect the background process (e.g., <1 second) or at least quick enough so that the user is not discouraged from using the U/1 translation technology (e.g., <3 seconds). Where there is a delay in the transmission of inputs through the mapping system, immediate feedback to acknowledge the inputs may be provided. For example, an overlay of the word "saving" may be placed to indicate that the "save" command has been selected.

V. User Interface Training

Figure 4:
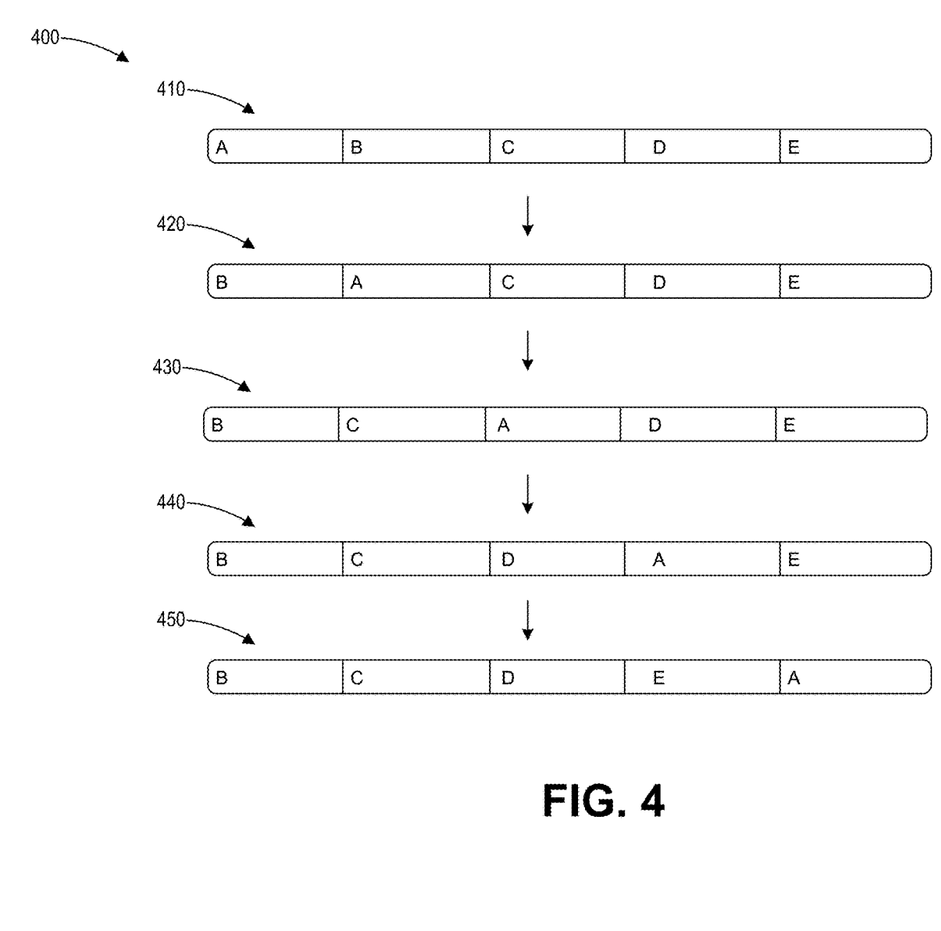

FIG. 4 illustrates an embodiment of a process 400 for training the user to become proficient with a new user interface gradually over time or usage. The user interface training process can be implemented by any of the systems described above. For illustrative purposes, the process 400 will be described as being implemented by components of the computing environment 200 of FIG. 2. The process 400 depicts an example overview of user interface training. The process can be performed in response to a user using the overlay interface for a period of time or based on an input from an administrator system 222. For example, a company may want to move users over to a new application (e.g., change from Microsoft Word to Google Docs), introduce a new feature in a user interface or rearrange the user interface controls. A sudden change in the user interface, however, might not be well received by the users. Accordingly, the process 400 can be used to change the user interface over a period of time or usage. In another embodiment, the training module 216 can automatically recognize that certain user controls are used more than others, either on an individual or a group level. The training module can automatically start rearranging the position of some user interface controls based on the usage patterns. For example, controls that might be used more often may be moved towards the center. In one aspect, controls that are used very infrequently might be immediately moved to the place they are in the native application interface, while controls that are frequently used might be moved more slowly. Movement may be controlled by time, use, or other measures.

In some embodiments, the change or modification to the overlay user interface can depend on user efficiency calculations or measurements. The training module 216 can store for example, the number of steps or time required to accomplish a task. For example, the training module 216 can track that rearranging "save" user control from a first location (the "file" menu) to a second location (the "document" menu) requires 30 seconds of inactivity as compared to 2 seconds before the rearrangement. The training module 216 can use the efficiency measurements to intelligently maintain the overlay user interface. In the above example, the "save" user control may be moved back to its original position or may temporarily appear in more than one place. In some embodiments, a help shortcut may appear in the first location. The help shortcut may assist users in training. For example, the "file" menu may have a "save" item that states "save—this has been moved to the document menu." The help shortcut may lead to the second location or may simply be a text or like.

FIG. 4 shows gradually changing the user interface control from step 410 to 450. The user interface controls at step 410 may represent application controls that are currently used (e.g., the user currently uses Microsoft Word), while the user interface controls at step 450 represent application controls that the user (and/or administrator, for example) desires to be used to control the underlying application (e.g., the organization may be moving to Google Docs). In this example, the user interface control "A" is gradually moved from the left most position to the right most position (e.g., the user interface control "A" may be located on the left in Microsoft Word, but on the right in Google Docs). The change can be over an absolute period of time or a period of time of usage. For example, the change between each step shown in FIG. 4 can take place every day, or over two days or over a week. In some embodiments, the change can be in response to instructions received from administrator system 222. Furthermore, administrator systems 222 may be given the ability to speed, slow, alter, or otherwise modify the transition between interfaces shown in FIG. 4. The change of interface arrangement can also be automated based on usage patterns. For example, a particular user might not be selecting the user control "A" on a regular basis. The training module 216 can accordingly move that user control "A" gradually away from a prominent position. Alternatively, user controls that are used on a regular basis (e.g., as compared to other user controls) may be moved to a non-prominent position in some embodiments, such as based on rules established by an administrator. In some embodiments, the training module 216 can change the size and shape of the user control over a period of time based on administrator instructions or usage patterns. Similar changes to user interface controls "B"-"E" may be made, either concurrent to changes in user interface "A" position and/or subsequent to changes to user interface control "A".

VI. Example Translated User Interfaces

Figure 5A:
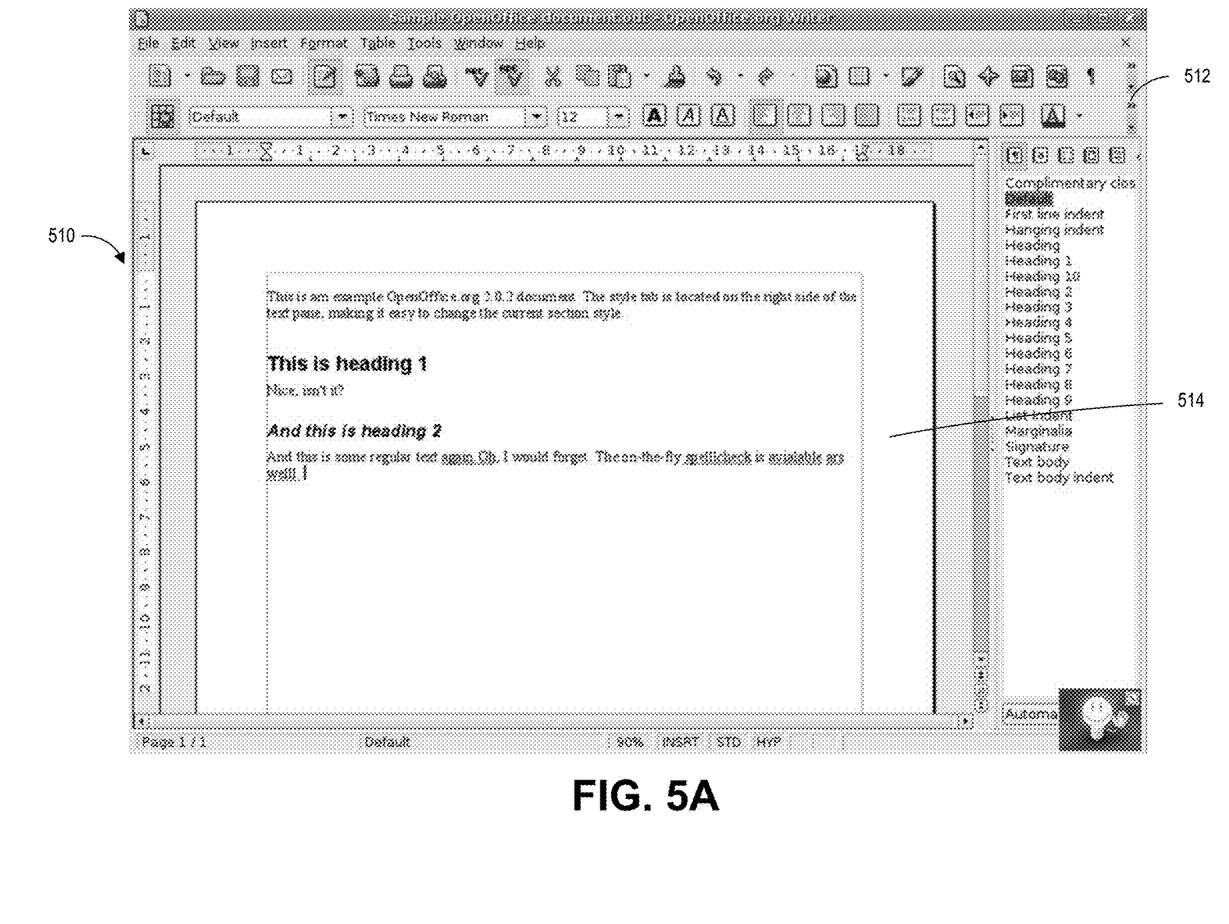
FIG. 5E illustrates an embodiment where a portion of the Google Docs user interface is translated to an overlay corresponding to the Microsoft Word user interface.
Figure 5B:
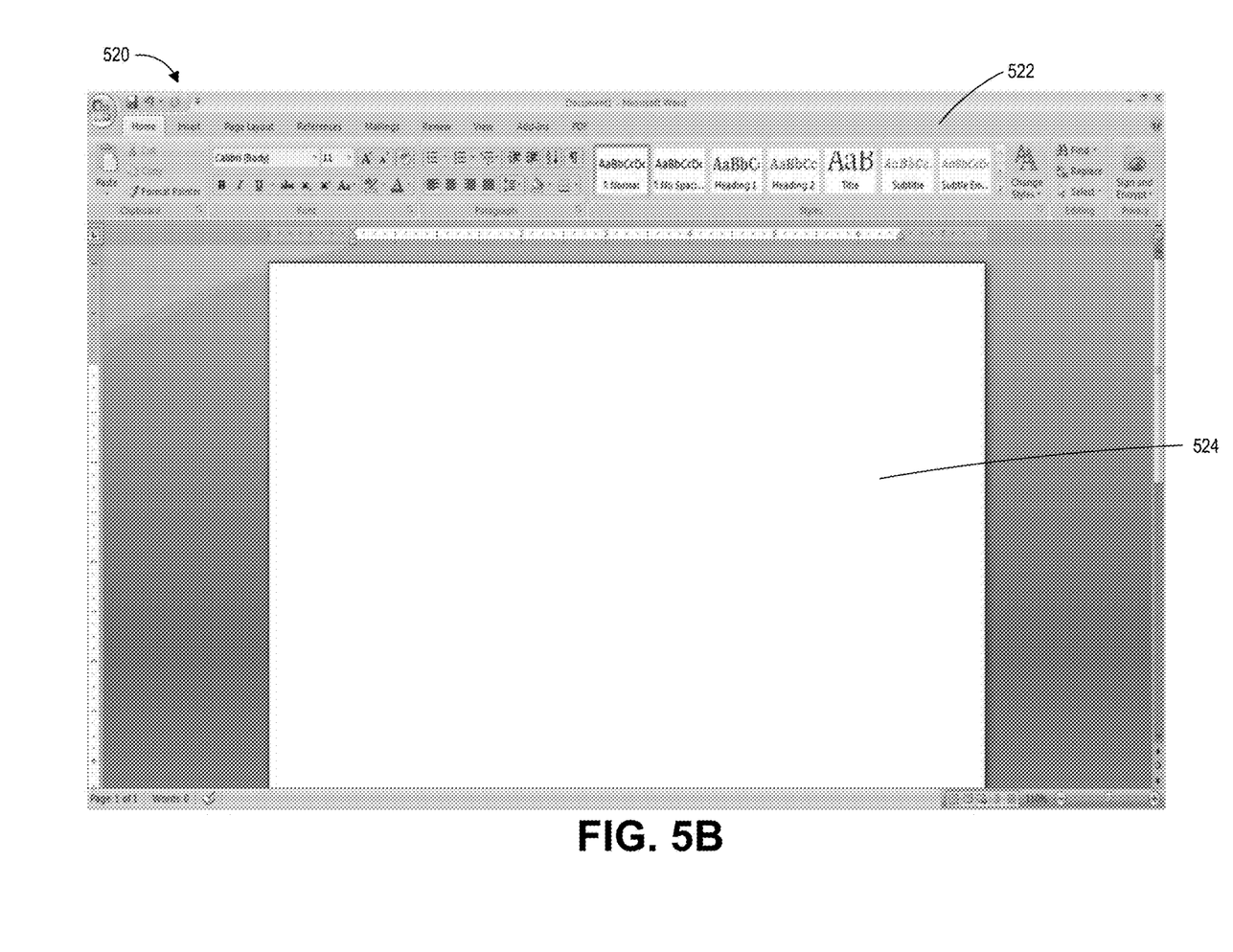
Figure 5C:
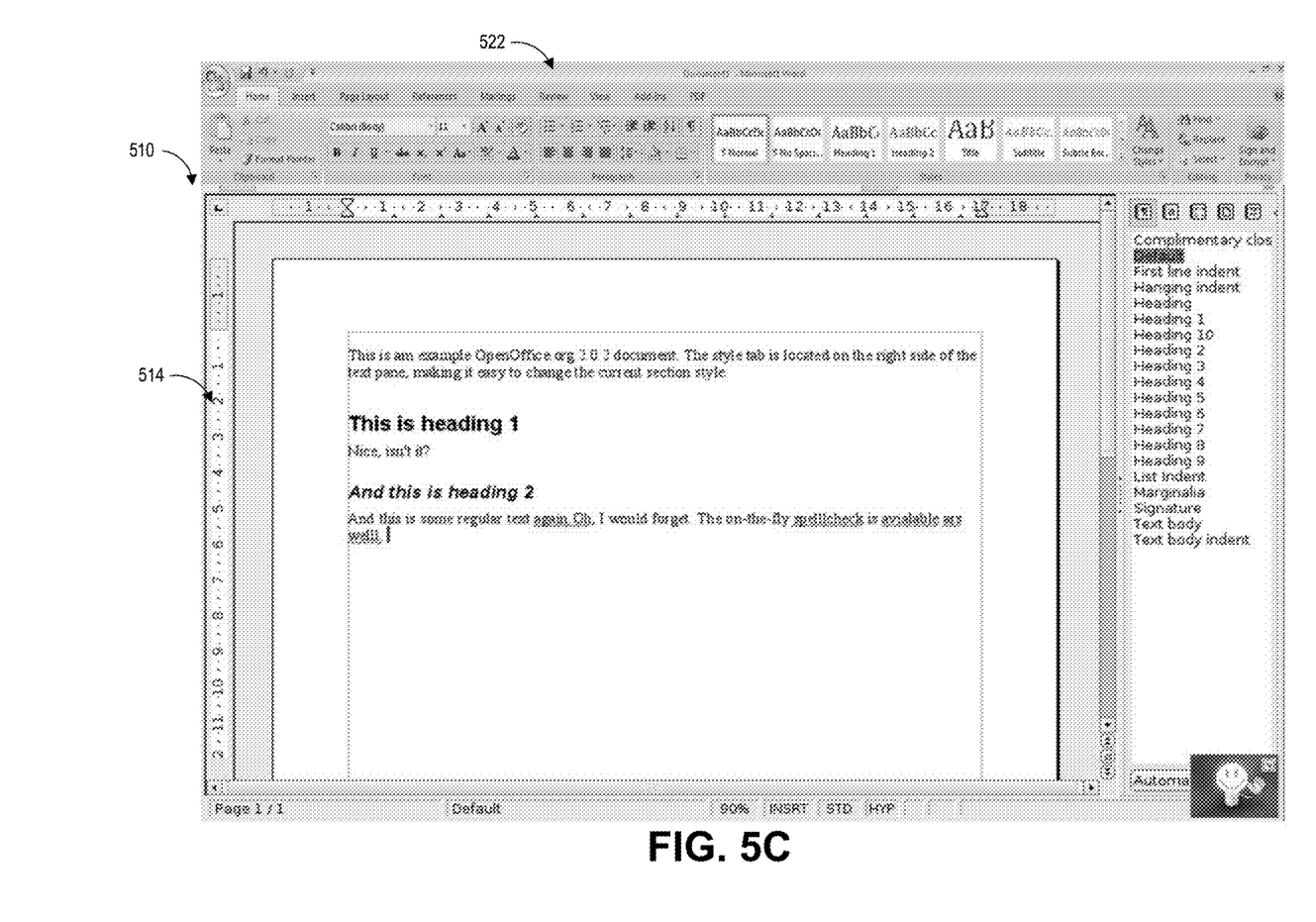

FIGS. 5A-E illustrate example embodiments of translated user interfaces with respect to particular applications. FIG. 5A illustrates an embodiment of a standard Open Office Word Processor user interface 510 including a first portion 512 and a second portion 514. FIG. 5B illustrates an embodiment of a standard Microsoft Word user interface 520 including a first portion 522 and a second portion 524. FIG. 5C illustrates a portion 512 of the Open Office user interface translated to a Microsoft Word overlay interface 522. The translated interface can be generated by the overlay interface generator module 214. In this example, users can select user controls from the overlay interface 522. The user control input is received by the translator module, which can then translate the command to a corresponding Open Office command. The translator module can then send the command to the Open Office application as described above. Accordingly, users can use Open Office for processing while interacting with a more familiar Microsoft Word user interface, preferably with the user not seeing the behind the scenes translation of user interface commands from the overlay interface to the underlying application.

Figure 5D:
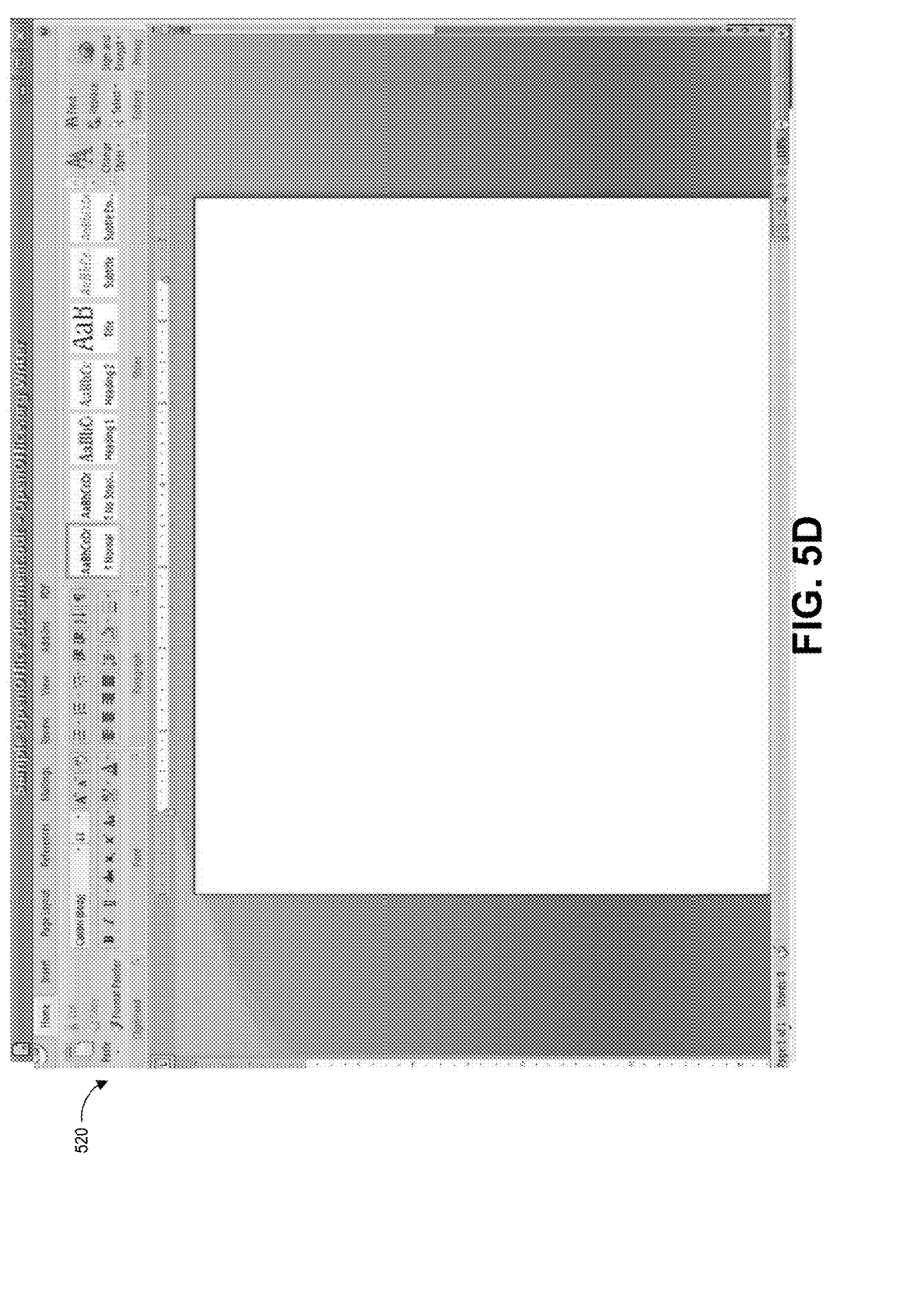
Figure 5E:
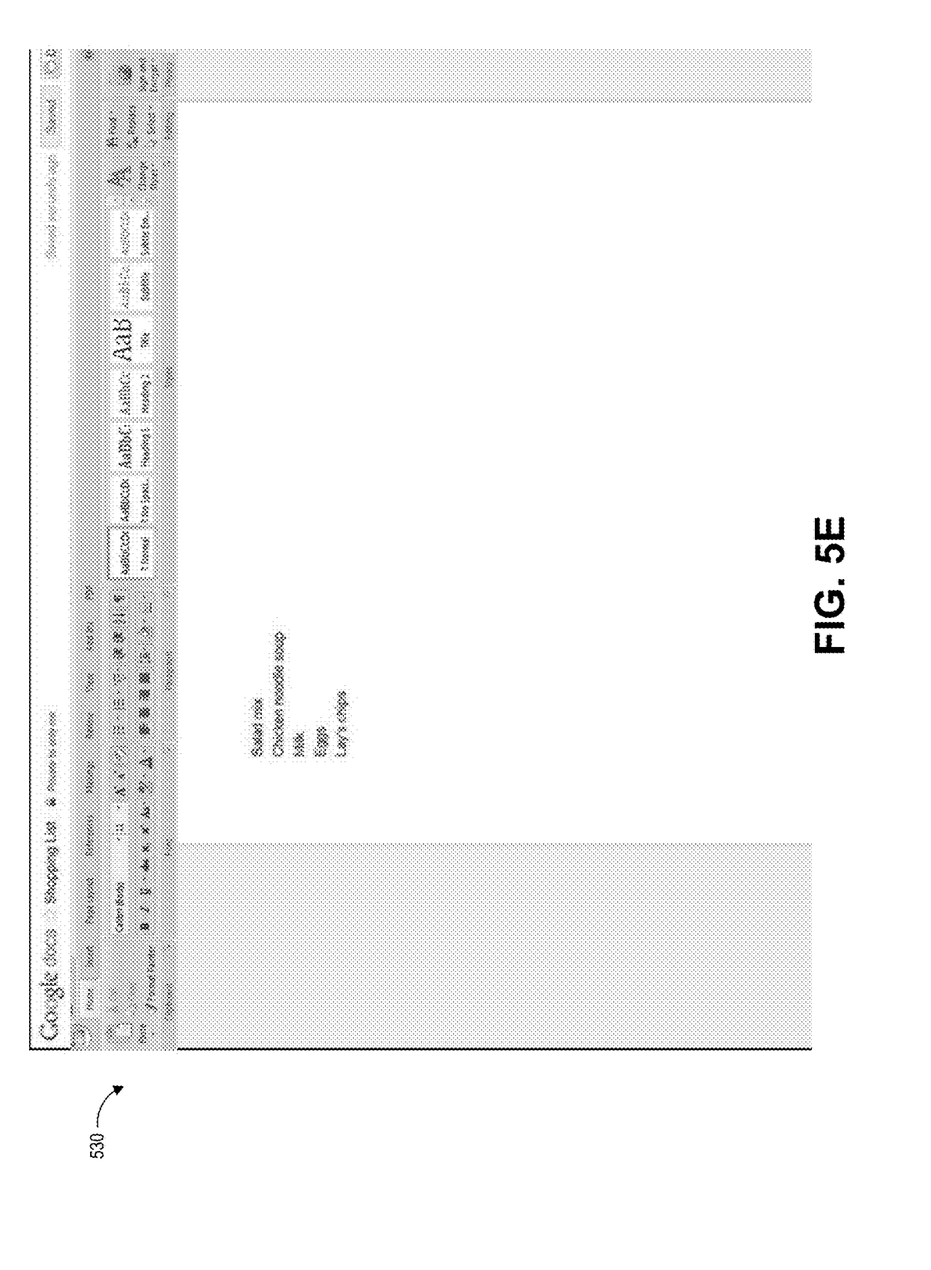

FIG. 5D illustrates an embodiment where the entire user interface of the primary application is translated to the overlay interface. In the illustrated example, users interact with a Microsoft Word overlay interface 520 while the processing may be done by Open Office as described above. FIG. 5E illustrates another embodiment where the entire user interface of the primary application (Google Docs) is translated to the overlay interface (Microsoft Office).

VII. Additional Embodiments

In some embodiments, licensed or free overlay interfaces may be used to avoid any copyright issues. For example, companies may have license to use an application, such as a license to use Microsoft Word. Thus, companies may be able to use an overlay interface that corresponds to Microsoft Word along with a different primary application, such as Open Office as described above. If desirable, including if desirable for the purposes of avoiding copying the Microsoft Word interface, the actual application may be run, but input to the application may be intercepted and redirected to the new application.

It should be noted that in addition to word processing applications, any of the features described here with respect to U/1 translation system can be implemented with other types of applications or games. For example, a portion of user interface of a racing game can be translated with a user interface overlay corresponding to another game. In another embodiment, user interface for a Toyota Prius can be translated to a Nissan Leaf user interface.

In one embodiment, the user interface translation system can also redirect communications between a client and a server for a particular game or application. For example, where a client software for Game A attempts to communicate with the server software for Game A, the communications may be redirected, such as by routing communications and/or by creating false DNS entries and/or by altering the code so that the communications are delivered to the server for Game B (or primary application), and the return data from the server for Game B delivered to the client software for Game A. In some implementations, the return data can be different than it would be if the data was sent to a Game B native client. The user interface translation system can map requests between Games A and B. Accordingly, the client software for Game A may be made interoperable with Game B. In other embodiments, certain "plug-in" or "add-on" elements for one game or application (such as a Facebook-based game) may be made interoperable with another system by controlling, via front-end, back-end, intermediary software or any combination thereof, an account that the game is dependent on (such as a Facebook account), and passing the data on to a different account (such as a Google+ account), so that a user who most actively uses the different account may utilize elements normally dependent on the other account without actually having to manually interact with the other account in the process. Without limiting the foregoing, substitution or modification of cascading style sheets, Flash, HTML5, or other code may be used.

VIII. Terminology

A number of computing systems have been described throughout this disclosure. The descriptions of these systems are not intended to limit the teachings or applicability of this disclosure. For example, the user systems and described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and intemperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A computing system for translating user interfaces, the system comprising one or more hardware processors configured to execute a plurality of software modules, the software modules including at least:

an overlay interface generator module configured to generate an overlay user interface associated with a secondary application, the overlay user interface configured for display in place of at least a portion of a user interface of a primary application, the overlay user interface comprising a plurality of user interface controls;

a translator module configured to:
      receive particular user control input corresponding to a particular user interface control of the plurality of user interface controls;
      translate the received particular user control input to a corresponding one or more commands associated with the primary application, wherein the corresponding one or more commands are selected such that execution of the one or more commands results in substantially the same output as execution of a command associated with the particular user interface control by the secondary application;
      initiate execution of the corresponding one or more commands by the primary application; and a training module configured to:
      identify a set of control inputs of the overlay user interface associated with the secondary application that have at least a materially different function than apparently analogous control inputs associated with the primary application; and
      upon interaction of the user with one or more of the set of control inputs, provide an indication to the user that the function of that control input in the primary application differs from the function it has in the secondary application.

2. The system of claim 1, wherein at least a portion of the overlay user interface associated with the secondary application is transparent.

3. The system of claim 2, wherein the portion of the user interface of the primary application that has an overlay user interface configured for display in place of the portion consists at least in part of a portion blocked by a non-transparent part of the overlay user interface associated with the secondary application.

4. The system of claim 1, wherein the indication is an information overlay.

5. The system of claim 1, wherein the user can customize the overlay interface.

6. The system of claim 1, wherein the overlay user interface associated with the secondary application is obtained from a running copy of the secondary application.

7. The system of claim 1, wherein the secondary application is run and input to the secondary application is redirected to the first application.

8. A computing system for translating user interfaces, the system comprising one or more hardware processors configured to execute a plurality of software modules, the software modules including at least:

an overlay interface generator module configured to generate an overlay user interface associated with a secondary application, the overlay user interface configured for display in place of at least a portion of a user interface of a primary application, the overlay user interface comprising a plurality of user interface controls;

a translator module configured to:
      receive a particular user control input corresponding to a particular user interface control of the plurality of user interface controls;
      translate the received particular user control input to a corresponding one or more commands associated with the primary application, wherein the corresponding one or more commands are selected such that execution of the one or more commands results in substantially the same output as execution of a command associated with the particular user interface control by the secondary application;
      initiate execution of the corresponding one or more commands by the primary application; and an output modification module configured to:
      intercept some or all data or output intended for display or other presentation to a user;
      alter the output to appear more consonant with the secondary application; and
      pass the altered output on to the user.

9. The system of claim 8, wherein at least a portion of the overlay user interface associated with a secondary application is transparent.

10. The system of claim 9, wherein the portion of the user interface of the primary application that has an overlay user interface configured for display in place of the portion consists at least in part of a portion blocked by a non-transparent part of the overlay user interface associated with the secondary application.

11. The system of claim 8, wherein the overlay user interface associated with the secondary application is obtained from a running copy of the secondary application.

12. The system of claim 1, wherein the secondary application is run and input to the secondary application is redirected to the first application.

13. A computing system for translating user interfaces, the system comprising one or more hardware processors configured to execute a plurality of software modules, the software modules including at least:
- an overlay interface generator module configured to generate an overlay user interface associated with a secondary application, the overlay user interface configured for display in place of at least a portion of a user interface of a primary application, said overlay user interface comprising a plurality of user interface controls; and
- a translator module configured to:
  - receive particular user control input corresponding to a particular user interface control of the plurality of user interface controls;
  - translate the received particular user control input to a corresponding one or more commands associated with the primary application, wherein the corresponding one or more commands are selected such that execution of the one or more commands results in substantially the same output as execution of a command associated with the particular user interface control by the secondary application;
  - an overlay interface feedback module configured to provide a user, with regard to at least one input by the user, with feedback that confirms the command has been received, wherein such feedback is initiated before or substantially simultaneously with passing the received user control input to the primary application via the translator module.

14. The system of claim 13, wherein at least a portion of the overlay user interface associated with the secondary application is transparent.

15. The system of claim 14, wherein the portion of the user interface of the primary application that has an overlay user interface configured for display in place of the portion consists at least in part of a portion blocked by a non-transparent part of the overlay user interface associated with the secondary application.

16. The system of claim 13, wherein the feedback is provided in response to determining that there may be a delay in the transmission of the input through the translator module.

17. The system of claim 16, wherein the delay is one second or greater.

18. The system of claim 13, wherein the feedback is one or more words indicating that the input has been received.

19. The system of claim 13, wherein the overlay user interface associated with the secondary application is obtained from a running copy of the secondary application.

20. The system of claim 13, wherein the secondary application is run and input to the secondary application is redirected to the first application.

* * * * *